No. 790,043. PATENTED MAY 16, 1905.
H. FIEDLER & W. GOLDBERG.
FALSE BOTTOM FOR MASH TUNS.
APPLICATION FILED DEC. 28, 1903.
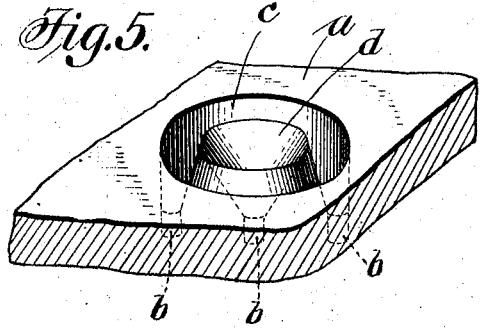
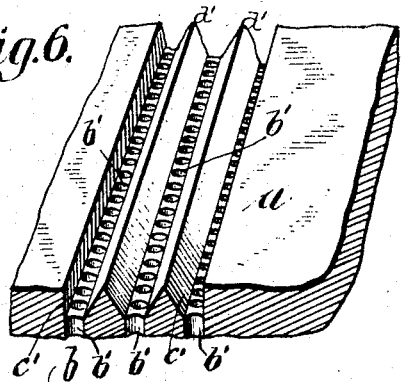
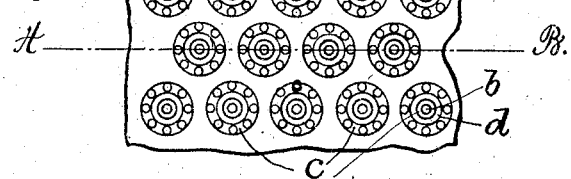
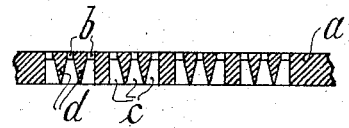
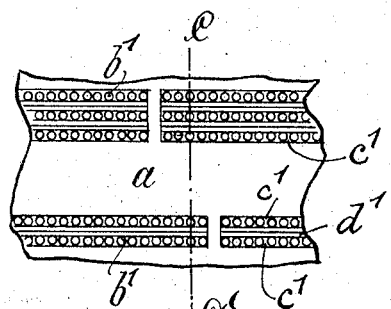
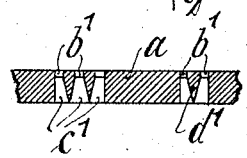
Witnesses:—
C. H. Schining
Paul Arras
Inventors:—
Hermann Fiedler & Walter Goldberg
by Paul Schilling
their attorney No. 790,043. Patented May 16, 1905.

UNITED STATES PATENT OFFICE.

HERMANN FIEDLER AND WALTER GOLDBERG, OF DRESDEN, GERMANY; SAID GOLDBERG ASSIGNOR TO SAID FIEDLER.

FALSE BOTTOM FOR MASH-TUNS.

SPECIFICATION forming part of Letters Patent No. 790,043, dated May 16, 1905.

Application filed December 28, 1903. Serial No. 186,822.

*To all whom it may concern:*

Be it known that we, HERMANN FIEDLER and WALTER GOLDBERG, subjects of the Emperor of Germany, residing at Dresden, Germany, have invented certain new and useful Improvements in False Bottoms for Mash-Tuns and the Like, of which the following is a specification.

The perforated false bottoms or plates employed in breweries, pressed or German yeast factories, and the like must, as is well known, be of a certain thickness, which, however, is disadvantageous owing to the resistance thus offered to the passage of the liquid through the fine holes. For the purpose of removing this defect we cut cylindrical or otherwise formed recesses in the under side of the bottom or plate extending nearly to the upper surface, and at such thinner places we provide the holes. The liquid filtering through the recesses, however, in consequence of adhesion drops with undue slowness, and the filtering process is thus appreciably affected by the firmly-adhering drops obstructing the flow of the liquid following. For this reason we arrange in the said recesses pins or annular or straight ridges or walls or the like tapering downward, and as the liquid filtering through obtains no hold on these tapering members it is conducted directly out of the recesses. The pins or annular or other ridges may be conveniently formed in cutting or turning the recesses. Their shape depends upon the form and width of the latter. They may, for example, be simple conical or wedge-shaped pins, the point being downmost, or they may be walls or ridges of annular, straight, or oval shape, likewise gradually tapering downward. Of whatever form they all present the same feature, that their base below the perforated plate reaches right up to the holes in the latter, so that each tapering member conducts the liquid from several holes and causes it to unite at the sharp point or edge below.

The drawings show two forms of construction which may be adopted for such a false-bottom plate.

Figure 1 is an under side view of a portion of a false bottom having cylindrical recesses with annular wedge-shaped ridge within. Fig. 2 is a section through Fig. 1. Fig. 3 is an under side view of a portion of a false bottom having long recesses and straight wedge-shaped ridges within them. Fig. 4 is a section through Fig. 3. Fig. 5 is an inverted perspective view, on an enlarged scale, of part of a plate constructed as shown in Figs. 1 and 2. Fig. 6 is an inverted sectional perspective view, on an enlarged scale, of part of a plate constructed as shown in Figs. 3 and 4.

Referring to Figs. 1, 2, and 5, the plate $a$ is provided with cylindrical recesses $c$ on the under side. The thin annular bottom of these recesses is then drilled with holes $b$, there being a central hole and a ring of others around it. Round the central hole is the annular ridge or ring $d$, which, as seen in section, Fig. 2, is wedge-shaped. The base of this ring terminates on the inside directly at the edge of the central hole and on the outside directly at the edge of the annular line of holes surrounding it.

In Figs. 3, 4, and 6 the recesses $c'$ are cut in a straight line and the holes $b'$ arranged in parallel rows. The wedge-shaped ridges $d'$, Fig. 4, are located between these rows of holes, their base terminating directly at the edge of the holes on either side.

What we claim is—

1. A false-bottom plate for mash-tuns and the like provided with a recess in its under face extending only partially through the plate, a tapering ridge within said recess projecting downwardly from the base thereof and terminating in a sharp edge, and holes through the base of the recess, adjacent to said tapering ridge, substantially as set forth.

2. A false-bottom plate for mash-tuns and the like provided with a circular recess in its under face extending only partially through the plate, an annular tapering ridge within said recess projecting downwardly from the base thereof and terminating in a sharp edge,
5 and holes through the base of the recess inside and outside of said annular tapering ridge, substantially as set forth.

In testimony that we claim the foregoing as our invention we have signed our names in presence of two subscribing witnesses.

HERMANN FIEDLER.
    WALTER GOLDBERG.

Witnesses:
 CHAS. L. COLE,
 PAUL ARRAS.